United States Patent [19]

Haynes

[11] 3,821,487

[45] June 28, 1974

[54] AUTOMATIC DIALING APPARATUS

[76] Inventor: Don A. Haynes, 1989 Osage Dr., Okemos, Mich. 48864

[22] Filed: May 7, 1973

[21] Appl. No.: 358,120

[52] U.S. Cl. .......... 179/90 AD, 179/90 B
[51] Int. Cl. .......... H04m 1/44
[58] Field of Search .......... 179/90

[56] References Cited

UNITED STATES PATENTS

| | | | |
|---|---|---|---|
| 3,207,853 | 9/1965 | DeFina et al. | 179/90 B |
| 3,557,311 | 1/1971 | Goldstein | 179/90 K |
| 3,634,631 | 1/1972 | Youngs | 179/90 CS |
| 3,659,058 | 4/1972 | Hernandez | 179/90 B |

*Primary Examiner*—Kathleen H. Claffy
*Assistant Examiner*—Gerald L. Brigance
*Attorney, Agent, or Firm*—Miller, Morriss, Papas & McLeod

[57] ABSTRACT

An automatic dialing apparatus for push button key telephone instruments having a rotatable cylinder provided with changeable pegs which selectively engage levers to depress the keys of a telephone instrument in any desired predetermined sequence. The automatic dialing apparatus is mounted upon the telephone instrument with its actuating levers in register with selected of the keys of the telephone instrument. The automatic dialing apparatus can be actuated by any standard emergency sensing and warning system so as to dial any desired number and/or actuate any desired type of warning device.

11 Claims, 10 Drawing Figures

AUTOMATIC DIALING APPARATUS

SUMMARY OF THE INVENTION

This invention consists of an automatic dialing apparatus which can be mounted upon any standard push button key telephone instrument so as to automatically dial any desired predetermined telephone number. The automatic dialing apparatus can be connected to any type of standard sensing system so as to begin operating whenever such a sensing system is activated.

Thus, the present invention consists of an apparatus for automatically dialing a telephone number or numbers from any location in case of an emergency, even though there is no one present at that particular location. This apparatus can be wired into any standard sensing system indicating refrigeration or heat failure, fire, flood or any type of unauthorized entry.

The present invention thus provides an inexpensive automatic dialing device to which any emergency sensing system can be wired. An owner of a business, home or apartment residence who is leaving his premises unoccupied for short or long periods of time can utilize this device in connection with a standard telephone instrument and a sensing system so as to provide inexpensive surveillance of their property. The automatic dialing device can be programmed to dial any desired telephone number so as to give any desired predetermined signal to indicate that something is amiss at the unoccupied location.

The automatic dialing apparatus consists of a housing which contains a rotatable cylinder provided with a plurality of holes into which pegs can be inserted so as to selectively engage and actuate levers which selectively depress the keys of a telephone instrument in any desired predetermined sequence. An additional lever and spring arrangement raises and lowers the telephone receiver in the proper sequence. Further, the apparatus is programmed to re-cycle the dialing system.

When the emergency is answered and the sensing system is reset, a positioning switch in the automatic dialing device always resets the apparatus for another emergency call.

If more than one dialing device is used in a system, each location can be identified by means of a code. This is accomplished by the use of additional pegs inserted into the rotating cylinder which strike a tuning form or switch so as to emit an identifying code. Other warning devices such as alarm bells, buzzer or tape recorded messages can be transmitted in the same manner.

It is therefore an object of this invention to provide an automatic dialing apparatus which can be used with any standard touch-tone telephone instrument to dial a predetermined telephone number when actuated by a warning sensing system.

Another object of this invention is to provide an automatic dialing apparatus whereby a dialing cylinder is provided with movable pegs thereon which selectively engage dialing levers that depress the keys of a standard telephone instrument in any desired predetermined sequence.

Yet another object of this invention is to provide an inexpensive automatic dialing apparatus whereby the telephone numbers being called can be easily changed by merely changing the relative positions of actuating pegs upon the rotating dialing cylinder.

A still further object of this invention is to provide an automatic dialing apparatus whereby a plurality of numbers can be called and/or indentification codes and pre-recorded messages can be transmitted.

Still another object of this invention is to provide an automatic dialing apparatus whereby the dialing sequence is periodically recycled.

Other objects and advantages found in the construction of the invention will be apparent from a consideration of the following specification in connection with the appended claims and the accompanying drawings.

DRAWINGS

SPECIFIC DESCRIPTION

Figures 1, 5, 7:
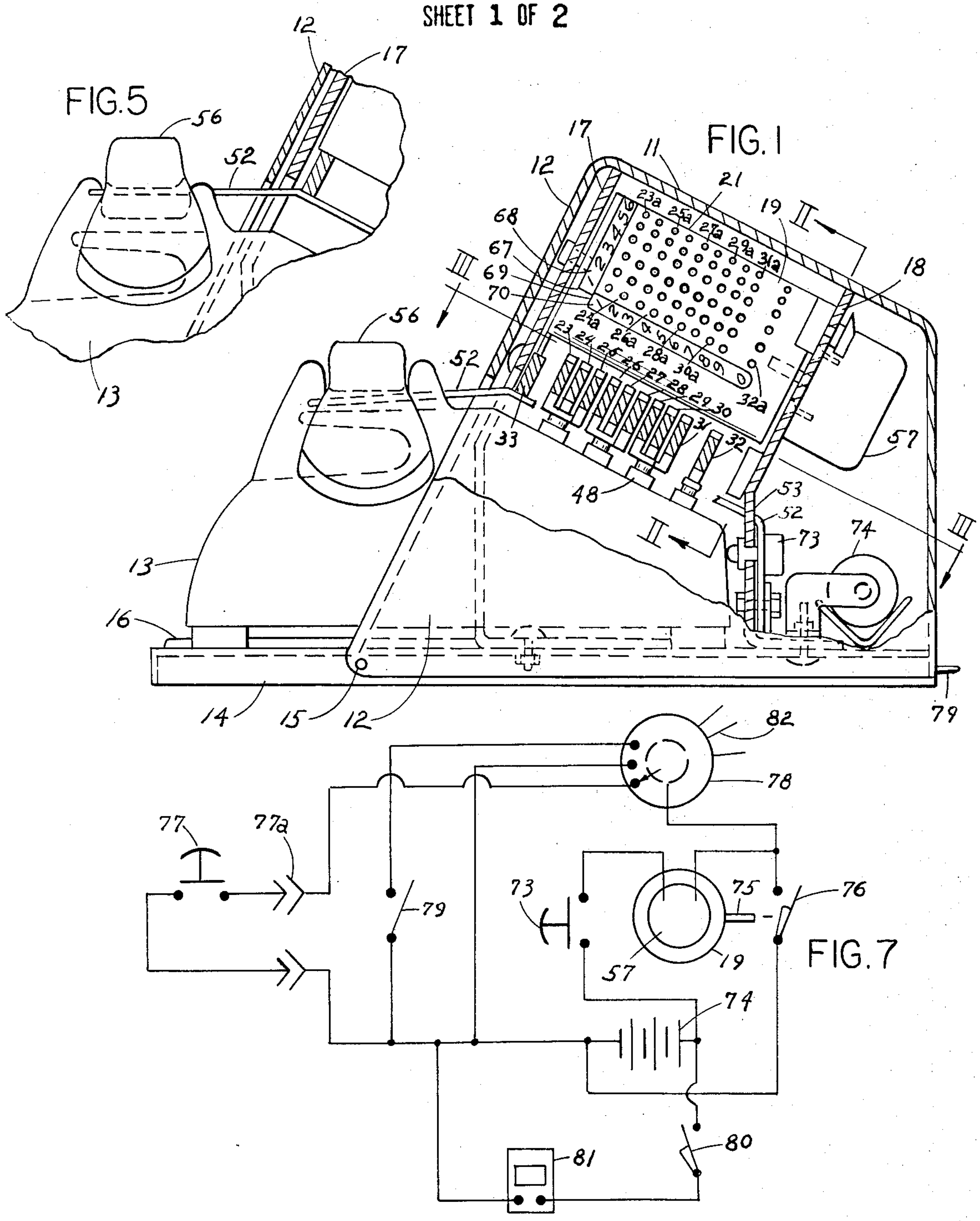
FIG. 1 is a side elevation breakaway view showing the automatic dialing apparatus in its operative use position on a standard telephone instrument.
FIG. 5 is a partial sectional view showing the receiver lifting spring and lever in its operative use position beneath the telephone receiver.
FIG. 7 is a schematic wiring diagram of the unit.
Figure 3:
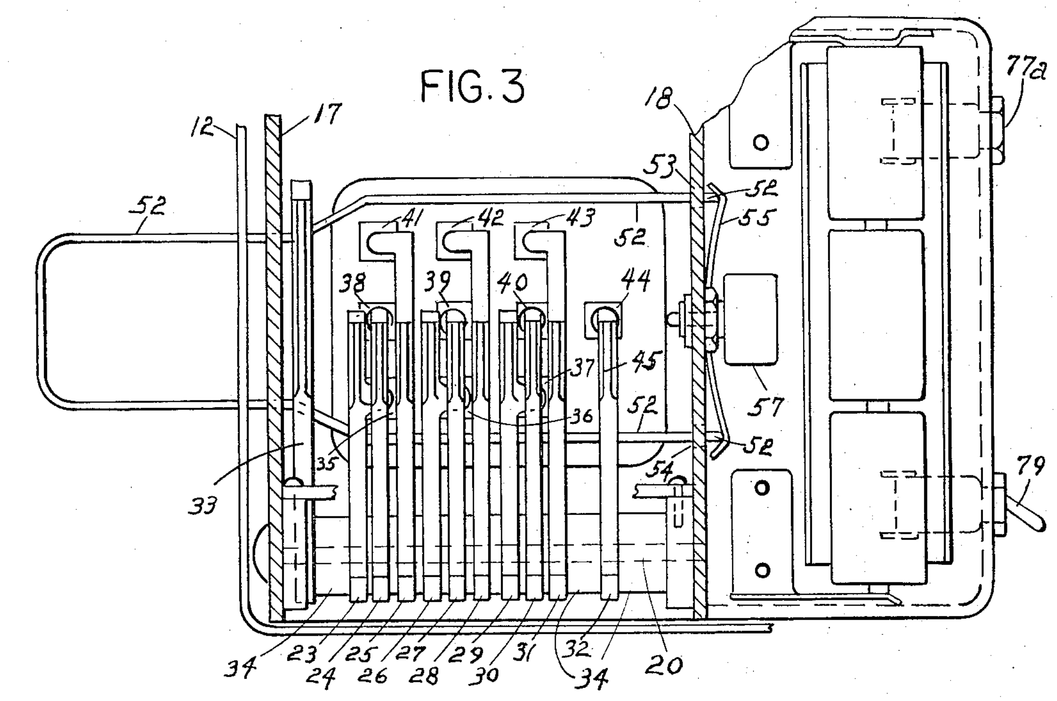
FIG. 3 is a sectional view taken on the line III—III of FIG. 1 showing the dialing levers and the keys of the telephone instrument in register therewith.

As shown in FIGS. 1 and 3, the automatic dialing device 11 is provided with a housing 12 into which a key dialing telephone instrument 13 is placed. The housing 12 is hinged to the base 14 by use of bolts 15 and can be pivoted forward for easy access to the interior of the unit. The base 14 is provided with a raised central portion 16 which guides the telephone instrument into position within the unit. A first mounting wall 17 and a second mounting wall 18 are mounted within the housing 12 in a parallel spaced-apart position.

The walls 17 and 18 support both a dialing cylinder 19 and the pivot shaft 20 for the dialing levers. The axis of the pivot shaft 20 is in a parallel spaced-apart position relative to the axis of the dialing cylinder 19. The dialing cylinder 19 is provided with a plurality of holes 21 which are adapted to receive actuating pegs 64.

The dialing levers 23, 24, 25, 26, 27, 28, 29, 30, 31, 32, along with receiver positioning lever 33, are pivotally mounted on the pivot shaft 20. Spacers 34 are provided on the shaft 20 so as to maintain the dialing levers in proper spaced-apart positions relative to each other.

Dialing levers 23, 26, and 29 are in operative register with and designed to depress telephone keys 35, 36 and 37, respectively.

Dialing levers 24, 27 and 30 are in operative register with and designed to depress telephone keys 38, 39 and 49, respectively.

Dialing levers 25, 28, 31 and 32 are in operative register with and are designed to depress telephone keys 41, 42, 43 and 44, respectively.

The dialing levers are fabricated from plastic, metal or any other suitable composite material such as fiberboard.

Figure 2:
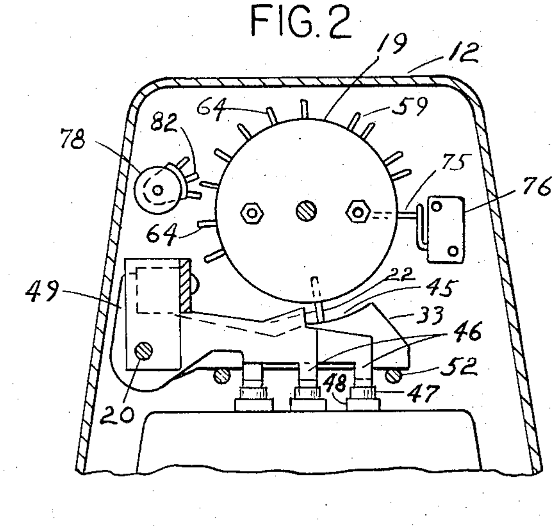
FIG. 2 is a sectional view taken on line II—II of FIG. 1 showing the pegs positioned on the rotating cylinder which engage the levers so as to selectively depress the keys in register therewith.

As shown in FIGS. 2 and 3, each of the levers 23 through 33 are provided with a cam surface 45 in the upper edge thereof. The cam surfaces 45 are grooved so that the respective pegs do not slip off as they pass thereover. A foot 46 extends downwardly from each dialing lever in operative register with its respective telephone key. Each foot 46 is provided with a rubber pad 47 which actually engages the telephone key 48 and also provides for any misalignment in the apparatus.

Figure 6:
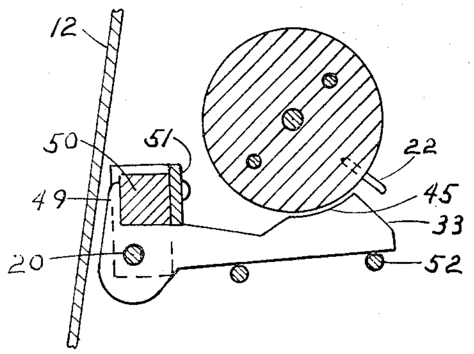
FIG. 6 is a partial sectional view of the rotating cylinder, the receiver lifting spring lever and the receiver lifting spring.

As shown in FIGS. 2 and 6, each of the levers is provided with an upwardly extending projection 49 which engages an elongate rubber spring pad 50. This prevents the dialing levers and the receiver positioning lever 33 from dropping down except when actually depressed by the pegs 64 passing thereover. The retaining plate 51 acts as an upper stop for the levers.

The design of the telephone receiver lifting spring 52 is shown in FIGS. 1 and 3. The ends of the lifting spring 52 are mounted through holes 53 and 54 in wall 18. The holes 53 and 54 act as pivot points for the spring 52 and the amount of lifting force in the spring 52 is controlled by the flat spring 55 mounted on wall 18 so as to engage the ends of the lifting spring 52. The bottom sides of the levers 23 through 32 are notched so as to provide clearance for the lifting spring 52. The lifting spring 52 extends under the dialing levers 23 through 32, under the receiver positioning lever 33 and extends outwardly to form a horizontal loop under the telephone receiver 56.

The combination of the receiver lifting spring 52 and the receiver positioning lever 33 cooperate to selectively raise and lower the telephone receiver 56 in the proper sequence during a telephone call.

FIGS. 1 and 2 show the receiver positioning lever 33 and lifting spring 52 in the lowered position. FIGS. 5 and 6 show lever 33 and spring 52 in the raised position.

As shown in FIG. 6, the receiver positioning lever 33 is configured similarly to the dialing levers, but it does not have a foot extension 46. It does have a longer cam area 45 that contacts peg 22 positioned in the dialing cylinder 19. This elongated cam area 45 provides for the positioning of the receiver 56 on the instrument 13 for the proper time interval between calls. It also positions the receiver 56 on the instrument 13 when the automatic dialing unit is not in use.

The receiver lifting spring 52 is under enough tension at all times to lift the telephone receiver 56 off the instrument 13. Therefore, enough pressure must be exerted against the top of the receiver lifting spring 52 to prevent it from lifting the receiver 56 until the desired sequence has been reached. This is achieved by means of peg 22 in the dialing cylinder 19 exerting sufficient pressure on the receiver positioning lever 33 to lower it against spring 52 at the proper sequence and releasing the pressure at the desired sequence to allow the spring 52 to rise, thereby once again lifting the telephone receiver 56 from its cradled position on the instrument 13.

The rotating dialing cylinder 19 can be made of any suitable material such as plastic or metal. It is mounted between walls 17 and 18 as previously described and is operatively connected to the motor 57. Although the motor 57 is a battery operated electric motor, it can be of any other type including a spring actuated unit.

Figure 4:
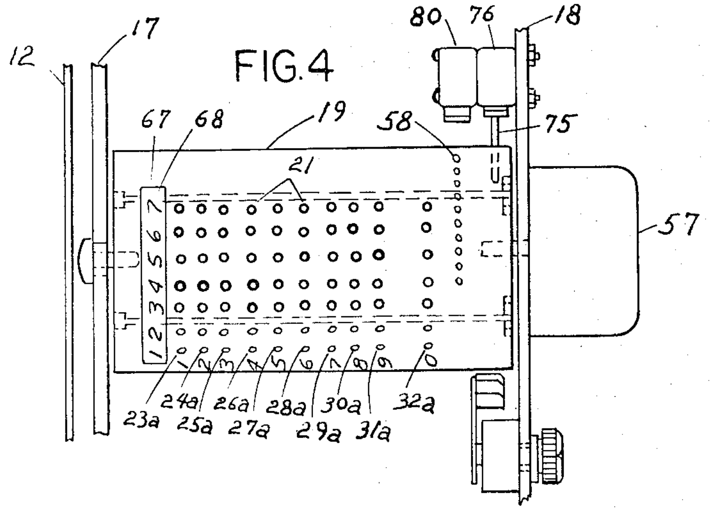
FIG. 4 is a plan view of the rotatable dialing cylinder and its actuating motor showing the plurality of holes in the outer peripheral surface thereof into which key and switch actuation pegs can be selectively mounted.

To accommodate any one area telephone number combination, a series of 70 spaced holes are provided in the cylinder to provide for each seven digit number which might be called. This is shown in FIG. 4 as seven aligned holes **23*a*, seven aligned holes 24*a* and so forth until a total of 70 is reached. By inserting a dialing peg 64** for each number desired and in the number sequence to be dialed, any seven digit number can be used.

A series of equally spaced holes 58 are also circumferentially provided around a portion of the dialing cylinder. Code pegs 59 are placed in certain of these holes to form a code. When the device is activated, the dialing cylinder 19 rotates so that code pegs 59 strike a tuning fork spring or code-emitting a buzzer switch 80.

Figure 8:
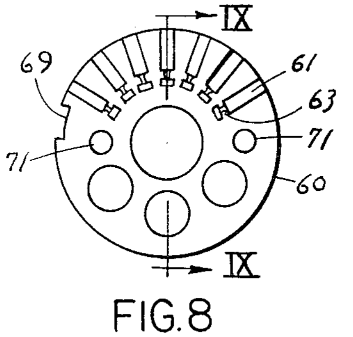
FIG. 8 is a plan view of one of the discs forming the cylinder showing the radially extending peg receiving grooves provided therein.
Figure 9:
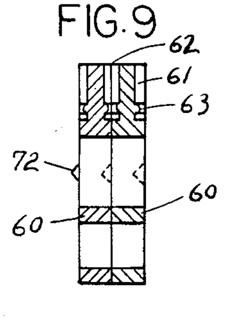
FIG. 9 is a sectional schematic view taken on line IX—IX of FIG. 8 showing two of the cylinder discs in their mating use position.
Figure 10:
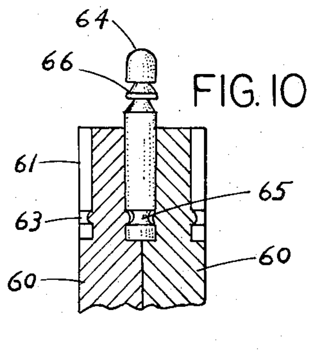
FIG. 10 is a sectional view of a portion of the cylinder formed by the mating discs showing a peg mounted therein.

An alternate method of constructing the dialing cylinder 19 is shown in FIGS. 8, 9 and 10. The alternate embodiment of the cylinder 19 is constructed by use of individual mating discs 60. Each disc 60 is provided with radially extending aligned grooves 61 on each side thereof. When the discs are matingly nested together, the grooves 61 form peg holes 62.

Each groove 61 has a slightly smaller area 63 near the bottom. When the discs 60 are assembled, this forms a lock ring to prevent the dialing pegs 64 from falling out.

The dialing pegs 64 are made with a smaller diameter 65 near the bottom, to coincide with the smaller diameter lock ring 63 in the hole 62. The pegs 64 also have annular grooves 66 near the top, to aid in removal.

A slight depression 67 is provided around part of the diameter of the cylinder. This is for a self-adhesive numbered strip 68 showing the sequence in which to insert the dial pins. A groove 69 also provided along the side of the cylinder adapted to receive a numbered strip 70 showing the number on each series of holes.

The discs 60 that make up the cylinder 19 must be in aligned register with each other. This is accomplished by means of register holes 71 with bolts running through to fasten the cylinder together. In a second method detents 72 on one side of each disc fit into indentations on the next adjacent disc. The discs are cemented together to form the cylinder.

The schematic wiring diagram set forth as FIG. 7 describes the basic overall operation of the invention. When the telephone instrument 13 is inserted into the housing 12 it closes the button switch 73 so as to energize the circuitry which is powered by the batteries 74. Thus, the motor 57 is actuated so as to cause the dialing cylinder 19 to rotate until the main control peg 75 opens the normally closed main control switch 76 thereby causing the entire unit to stop in a ready position for recycling. In this position, the telephone receiver 56 is lowered onto its cradled position on the telephone instrument 13. A sensing switch 77 such as a thermostat, burglar alarm or the like is operatively connected to the dialing apparatus by use of a plug 77*a*. When the sensing or warning system is actuated by a change in temperature beyond the permitted limit or by an intruder, the sensing switch 77 closes in response thereto. The leaf spring rotary cycling switch 78 is thus energized causing the motor 57 to operate so as to begin the dialing sequence. The rotating cylinder 19 as shown in FIG. 2 thus moves the various dialing and actuating pegs into contact with the various actuating or dialing levers on the unit. The receiver spring peg 22 disengages from the receiver spring lever 33 so as to permit the receiver spring 52 to lift the telephone receiver 56 from its cradled position, thus preparing the telephone instrument for placing the predetermined call. Thereafter, the dialing pegs 64 sequentially engage the dialing levers 23 through 32 so as to cause a corresponding actuation of the telephone keys 48 to dial the desired number. In apparatus as shown, the dialing sequence is repeated for two times by operation of the leaf spring switch 78. The number of times that the dialing sequence occurs can be varied by adding additional positions to the switch 78. A buzzer switch 80 is actuated by the code pegs 59 so as to actuate the buzzer 81.

The leaf spring switch 78 is a rotary switch which acts to limit the number of calls the device makes. This is accomplished by means of peg 75 sequentially striking each leaf 82 and rotating the switch 78 one position with every revolution. The toggle switch 79 is wired to the third position of the switch 78. If two complete telephone calls to the same number are desired, the toggle switch 79 is switched to the "off" position. If an unlimited number of calls to the same number is desired, then the toggle switch 79 is placed to the "on" position.

The buzzer 81 (not shown) is located on the base proximate to the receiver 56. A series of small holes (not shown) through the base transmit the sound to the receiver. The buzzer 81 is attached to the battery power supply and is actuated by pegs 59 striking the buzzer switch 80.

It is thus seen that a unique type of automatic dialing apparatus is provided which is inexpensive to produce and which is simple in operation. The desired numbers to be dialed can be easily programmed into the unit and can be easily changed by merely moving the dialing pegs in the holes provided in the dialing cylinder.

Although an automatic dialing apparatus having a specific configuration has been described herein, it is within the scope of this invention to vary the design of the apparatus in any desired manner as long as a dialing cylinder is provided with movable pegs which are utilized to actuate dialing levers in the manner described herein.

Various modifications of the invention may be made without departing from the principle thereof. Each of these modifications is to be considered as included in the hereinafter appended claims unless these claims, by their language expressly provide otherwise.

Having thus set forth the nature of my invention, I claim the following:

1. In an automatic dialing apparatus for use with a touch-tone telephone instrument, the combination comprising:

a. a housing, said housing adapted for mounting in association with a touch-tone telephone instrument;

b. a dialing cylinder rotatably mounted within said housing, said dialing cylinder provided with dialing peg holes in the outer surface of said cylinder;

c. a plurality of parallel spaced-apart spring-biased dialing levers mounted on said housing in tangentially spaced-apart positions with respect to said dialing cylinder, each of said levers aligned with selected of the keys of a telephone instrument;

d. a plurality of dialing pegs mounted in selected of said dialing peg holes in said dialing cylinder, each of said dialing pegs adapted to selectively engage selected of said dialing levers upon rotation of said cylinder so as to selectively move said dialing levers into operative contact with selected of the keys of a telephone instrument in a predetermined dialing sequence; and e. means to selectively rotate said dialing cylinder in a response to a predetermined signal.

2. In the automtic dialing apparatus of claim 1 wherein said housing is provided with a telephone receiver lifting spring, said telephone receiver lifting spring adapted to extend into operative engagement with a telephone receiver.

3. In the automatic dialing apparatus of claim 2 wherein said housing is provided with a spring biased telephone receiver lifting spring positioning lever mounted in a tangentially spaced-apart position with respect to said dialing cylinder, said telephone receiver lifting spring positioning lever adapted to selectively extend into operative engagement with said telephone receiver lifting spring.

4. In the automatic dialing apparatus of claim 3 wherein a normally closed main control positioning switch is provided on said housing, said main control positioning switch adapted to deenergize said dialing cylinder motor means when said main control positioning switch is operatively engaged by a main control positioning peg mounted on said dialing cylinder.

5. In the automatic dialing apparatus of claim 4 wherein a tuning fork is provided on said housing, said tuning fork adapted to be selectively engaged by tuning fork code pegs selectively positioned on said dialing cylinder so as to emit a predetermined code as said cylinder rotates.

6. In the automatic dialing apparatus of claim 1 wherein each of said dialing levers is provided with foot extension adapted to selectively engage a key on the telephone instrument.

7. In the automatic dialing apparatus of claim 1 wherein battery power means are provided in association with said dialing cylinder motor means.

8. In the automatic dialing apparatus of claim 1 wherein a rotary actuating switch is provided on said housing in association with said dialing cylinder motor means, said rotary actuating switch adapted to recycle said motor means in predetermined manner when engaged by main control positioning peg mounted on said dialing cylinder.

9. In the automatic dialing apparatus of claim 7 wherein a buzzer having a buzzer switch attached thereto is provided on said housing, said buzzer being energized in a predetermined manner when said buzzer switch is engaged by buzzer switch code pegs provided on said dialing cylinder.

10. In the automatic dialing apparatus of claim 9 wherein a unit activating switch is provided on said housing in association with said battery means and said dial cylinder motor means, said unit activating switch adapted to engage the telephone receiver so as to activate the automatic dialing apparatus when siad housing is mounted in association with the telephone receiver.

11. In the automatic dialing apparatus of claim 1 wherein said dialing cylinder comprises a plurality of mating discs, each of said discs provided with a plurality of radially extending grooves which cooperate to form peg holes when said discs are in aligned mating register with each other.

* * * * *